United States Patent [19]

Toussan

[11] 3,886,594

[45] May 27, 1975

[54] FLEXIBLE DISC MEMORY DEVICES

[75] Inventor: Michel Toussan, Ermont, France

[73] Assignee: Societe d'Applications Generales d'Electricite et de Mecanique S A G E M, France

[22] Filed: July 26, 1973

[21] Appl. No.: 382,751

[30] Foreign Application Priority Data

Aug. 7, 1972 France .............................. 72.28463

[52] U.S. Cl. .................................................. 360/102

[51] Int. Cl. .............................................. G11b 5/60

[58] Field of Search .............. 360/102, 103, 94, 733

[56] References Cited

UNITED STATES PATENTS

| | | | |
|---|---|---|---|
| 3,303,485 | 2/1967 | Lee | 340/174.1 E |
| 3,304,527 | 2/1967 | Marrs et al. | 340/174.1 E |
| 3,405,405 | 10/1968 | Boisseuvain et al. | 340/174.1 E |
| 3,537,083 | 10/1970 | Voth | 340/174.1 E |
| 3,737,880 | 6/1973 | Kelley | 340/174.1 E |

*Primary Examiner*—Vincent P. Canney
*Attorney, Agent, or Firm*—Larson, Taylor and Hinds

[57] ABSTRACT

A recording and reading head is borne by a support foot which rests, with the interposition of a hydrodynamic gaseous film, on a zone of the flexible disc stabilised by a reference part supplied with gas under pressure. The invention applies to disc memory devices in which the flexible disc is protected in a cassette.

12 Claims, 8 Drawing Figures

Patented May 27, 1975 3,886,594

5 Sheets-Sheet 2

FLEXIBLE DISC MEMORY DEVICES

The invention relates to flexible disc memory devices comprising, on one hand, a flexible disc (or several flexible discs) cooperating with rotary drive means and of which one at least of the two faces has a coating of magnetic material, and on the other hand, a recording and reading head (or several recording and reading heads) adapted to record information on this magnetic coating and/or to read information occuring on said magnetic coating.

In such devices, the problem resides principally in the positioning of the flexible disc with respect to the recording and reading head.

It has already been proposed to arrange, on both sides of the flexible disc, two fixed parts of which the facing sides of the two faces of the flexible disc form two hydrodynamic gaseous bearings, the recording and reading head being borne by one of these two parts. However, this solution has the drawback of being relatively complex and it leads to the production of a device which lends itself with difficulty to arrangement in the form of a cassette, that is to say an arrangement according to which the flexible disc is protected in a cassette intended to be introduced into an apparatus shielding the recording and reading head, the associated electronic equipment, and the means for driving the flexible disc in rotation.

It has also been proposed to fix at the central portion of the flexible disc on a rigid disc forming a support and comprising a plurality of orifices traversing it from one side to the other, the flexible disc and rigid disc rotating at the same speed; flows of gas are generated in orifices of the rigid disc and these flows of gas cause the detatchment of the free portion of the flexible disc, which is lifted to come into cooperation with a fixed facing annular track to form a hydrodynamic gaseous bearing. This fixed annular track, which can, if necessary constitute the wall of a cassette, comprises a radial opening at the level of which a recording and reading head is located. However, this solution does not ensure a very accurate positioning between the head and the flexible disc given that at the level of said head the stabilising effect of the hydrodynamic gaseous bearing is disturbed by the presence of the radial opening arranged in the fixed annular track.

There have also been proposed devices with two successive gaseous bearings, that is to say devices comprising a first hydrostatic and/or hydrodynamic gaseous bearing defined between a rotary flexible disc and a non-rotary rigid disc, and a second hydrodynamic gaseous bearing defined between the rotary flexible disc and the recording and reading head which is arranged in projection with respect to the rigid disc. Under these conditions, it is necessary to obtain a relatively accurate positioning between the rigid disc and the recording and reading head, which leads to relatively complex production; moreover, it is difficult to dissociate the flexible disc — rigid disc assembly from the recording and reading head, and the device hence lends itself with difficulty to arrangement in the form of a cassette.

It is an object of the invention to provide a flexible disc memory device which overcomes the drawbacks which have just been considered with regard to devices known hitherto.

It is another object of the invention to provide a device in which the position of the recording and reading head is fixed with respect to a stabilised zone of the flexible disc.

It is a further object of the invention to provide a device which lends itself particularly well to arrangement in the form of a cassette.

It is yet another object of the invention to provide a simple device, which needs no adjustment.

The device according to the invention is characterised by the fact that it comprises a fixed reference part, arranged parallel and close to the plane of rotation of the flexible disc, this reference part being arranged radially and having facing the corresponding face of the flexible disc, a convex surface such that the section through a radial plane cuts this surface along a straight line and that the section through a tangential plane (that is to say perpendicular to the orientation of the reference part) cuts this surface along a convex curve, this reference part comprising on its convex surface one or several orifices, connected to supply means for gas under pressure and arranged to deliver one or several gaseous flows forming a radial gaseous curtain directed towards the flexible disc, the recording and reading head of such a device being situated on the other side of the reference part with respect to the flexible disc and being positioned with respect to the flexible disc.

There is then obtained a stable position of the zone of the flexible disc situated facing the reference part, this stable position being established at a distance of the order of 30 to 80 microns from the above-said reference part.

The stable character of this position arises from the fact that to make the flexible disc approach the reference part, it will be necessary to exert a pressure of the order of several hundreds of grams/$cm^2$; to separate the flexible disc from this reference part it would be necessary to exert a much slighter pressure than the previous pressure, which remains however of the order of several tens of grams/$cm^2$.

It will then be seen that the zone of the flexible disc situated facing the reference part is held close to this reference part (at a distance of the order of 30 to 80 microns) and that it is possible to position the recording and reading head with respect to this zone, for example by making it rest directly on the flexible disc with the interposition of a hydrodynamic gaseous bearing, the effect of the head on the flexible disc being manifested by a pressure of the order of 100 g/$cm^2$, which does not modify in practice (or at most reduces to very slight proportions) the distance between the flexible disc and the reference part, which distance is fixed by the thickness of the hydrodynamic gaseous film which is of the order of a micron.

According to a preferred embodiment of the invention, the one or more orifices of the reference part open on the convex surface in its region closest to the flexible disc.

According to another preferred feature of the invention, the convex surface of the reference part is such that a section through a tangential plane has a circular arcuate contour; such a convex surface can be conical or cylindrical.

In any case, the device according to the invention lends itself to arrangement in the form of a cassette.

According to one embodiment of the invention, the reference part forms part of the apparatus intended to receive the cassette, the wall of said cassette then comprising an opening enabling the reference part to cooperate with the flexible disc.

According to another embodiment of the invention, the reference part can form part of the cassette, in which case there are provided connecting means for the connection between said reference part and the pressurised gas supply means.

The invention consists, apart from the features which have just been discussed, of certain other features of which are preferably used at the same time and which will be more explicitly considered below.

The invention will, in any case, be well understood with the aid of the supplementary description which follows, as well as of the accompanying drawings, which supplement and drawings relate to preferred embodiments of the invention and do not, of course, imply any limiting character.

FIG. 1 of these drawings is a sectional view of one embodiment of a flexible disc memory device constructed according to the invention.

Figure 7:
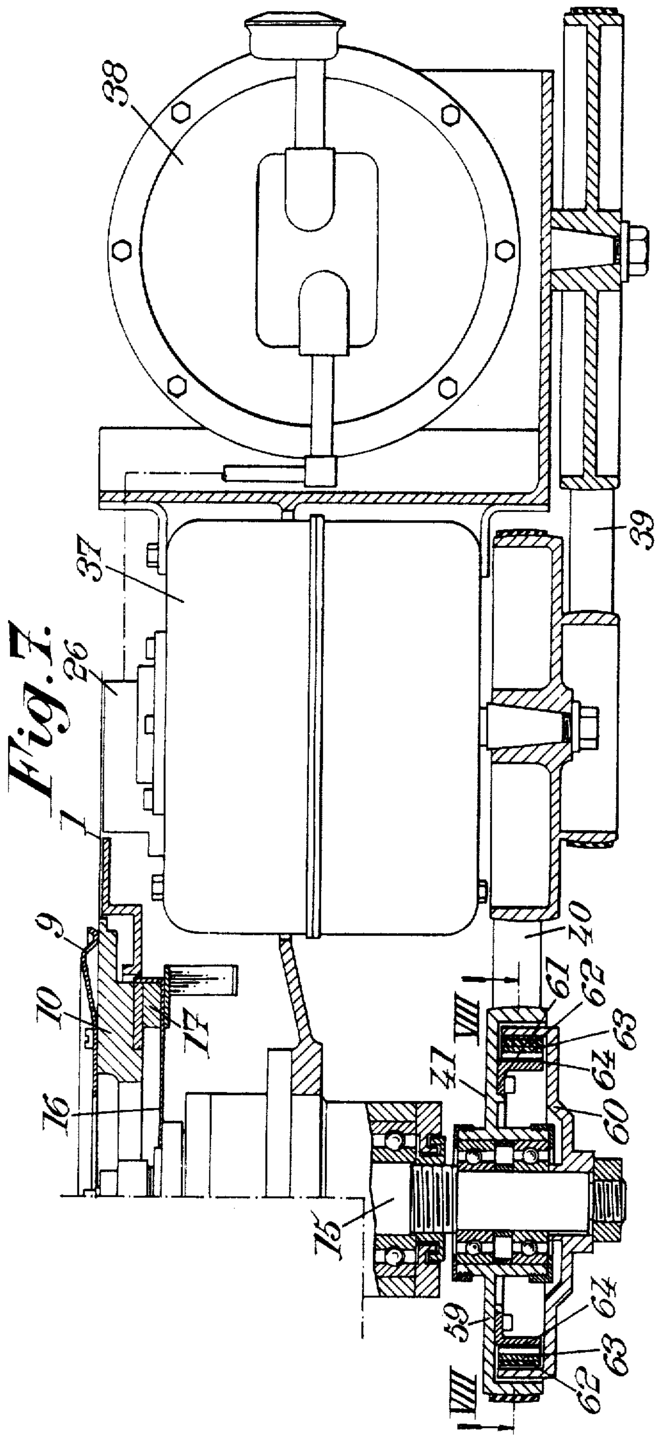
Figure 8:
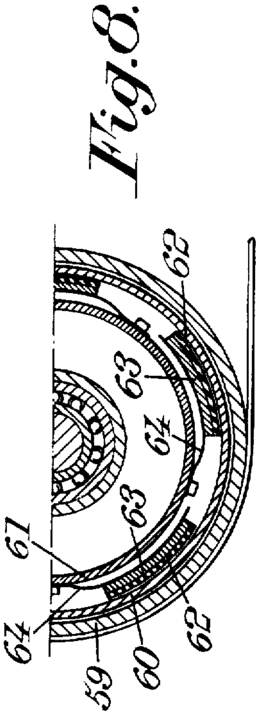

FIG. 8 lastly, is a partial section along the line VIII—VIII of FIG. 7.

The flexible disc memory device shown in FIGS. 1, 3, 5, 6 and 7 is a device arranged in the form of a cassette, in which the flexible disc 1 is protected in a cassette, denoted in a general way by the reference numeral 2, intended to be introduced into an apparatus, denoted in a general way by the reference numeral 3, which protects the recording and reading head 4, the associated electronics (not shown) and the rotary drive means 5 of the flexible disc 1.

The recording and reading head 4 is borne by a support foot 6 fixed at the end of an arm 7 fast to a drive device 8 which can comprise a stepping type motor to cause a linear translation of the recording and reading head 4 in a radial direction.

The flexible disc 1 is held by an elastic clamping flange 9 fixed on the hub 10 having, in its axial portion, a female centering cone 11.

This female centering cone 11 is engaged on a male centering cone 12, which ensures correct positioning of the hub 10 and of the flexible disc 1.

Rotary drive means 5 can then be constituted by a drive shaft 15 of which the end bears a plate 16 provided with an annular magnet 17 which cooperates with the hub 10 to drive the flexible disc in rotation.

Figure 1:
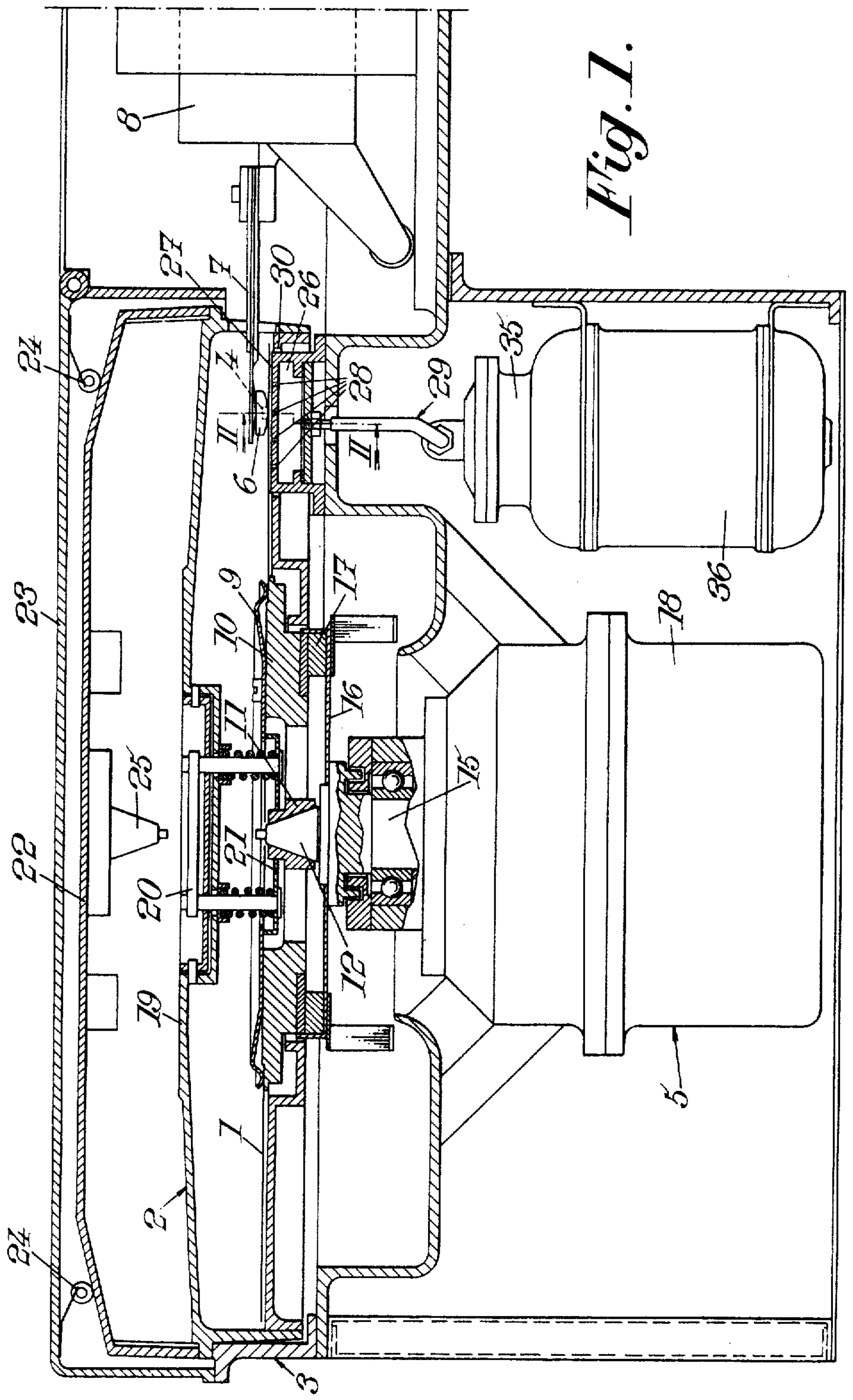

In the embodiment shown in FIG. 1, the drive shaft 15 is driven directly by an electric motor 18.

The cassette 2 comprises a cover 19, in which is arranged the handle 20 actuating an engagment device 21 to engage below the clamping flange 9 and enable unfastening of the hub 10 from the annular magnet 17 when this handle 20 is pulled.

A removable cap 22 is inserted between the cover of the cassette 19 and the cover 23 enabling the introduction of the cassette 2 into the apparatus 3.

Pressure rollers 24 are provided to thrust on the removal cap 22 and the cassette 2 hence is held in the apparatus 3 at the level of a shoulder provided for this purpose. As a result the female centering cone 11 comes into contact with the male centering cone 12, which ensures centering; moreover, the hub 10 becomes held flat against the annular magnet 17, which ensures simultaneously, on one hand, the making fast of the disc bearing plate with the drive shaft 15 due to the magnetic forces, on the other hand, the positioning of the theoretical reference plane of the flexible disc 1 with respect to the apparatus 3, and on the other hand lastly, the unfastening of the engaging device 21 with respect to the clamping flange 9, which permits the rotation of the flexible disc 1.

This removal cap 22 comprises at its center a conical part 25, so that when the cassette is withdrawn from the apparatus 3 the removal cap 22 is arranged on the side of the hub 10, the abovesaid conical part 25 then coming into cooperation with the female centering cane 11, which immobilises the flexible disc 1.

This being the case and according to the invention, the flexible disc memory device comprises a fixed reference part 26, arranged parallel and close to the plane of rotation of the flexible disc 1, this reference part 6 being oriented radially and having, opposite the corresponding surface of the flexible disc 1, a convex surface 27 such that the section through a radial plane cuts this surface 27 along a straight line (FIGS. 1 and 3), and that the section through a tangential plane perpendicular to the orientation of the reference part 26 cuts this surface 27 along a convex curve (FIGS. 2 and 4), advantageously formed by an arc of a circle.

This reference part 26 comprises, on its convex surface 27, one or several orifices 28 connected to supply means for gas under pressure, denoted generally by the reference numeral 29, these orifices 28 being arranged to deliver one or several gaseous flows forming a radial gaseous curtain directed towards the flexible disc 1.

The recording and reading head 4 is situated on the other side of the reference part 26 with respect to the flexible disc 1, and it is positioned with respect to the flexible disc 1.

This positioning can advantageously be obtained by making the recording and reading head 4 borne by its support pad 6 rest supported on the flexible disc 1 with the interposition of a hydrodynamic gaseous bearing which is generated by the relative movement between the flexible disc 1 and the recording and reading 4 — support pad 6 assembly. The thickness of the hydrodynamic gaseous film is especially a function of the support pad 6 and of the force with which this support pad 6 is urged towards the flexible disc 1.

Figure 4:
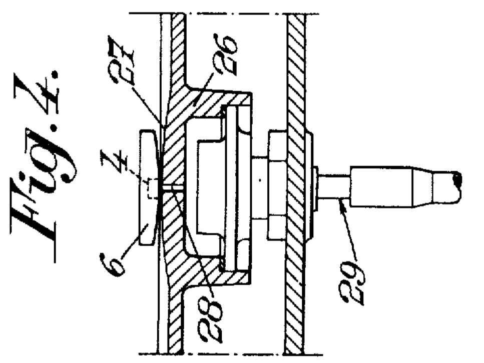
FIG. 4 is a section along the line IV—IV of FIG. 3.
Figures 2, 3:
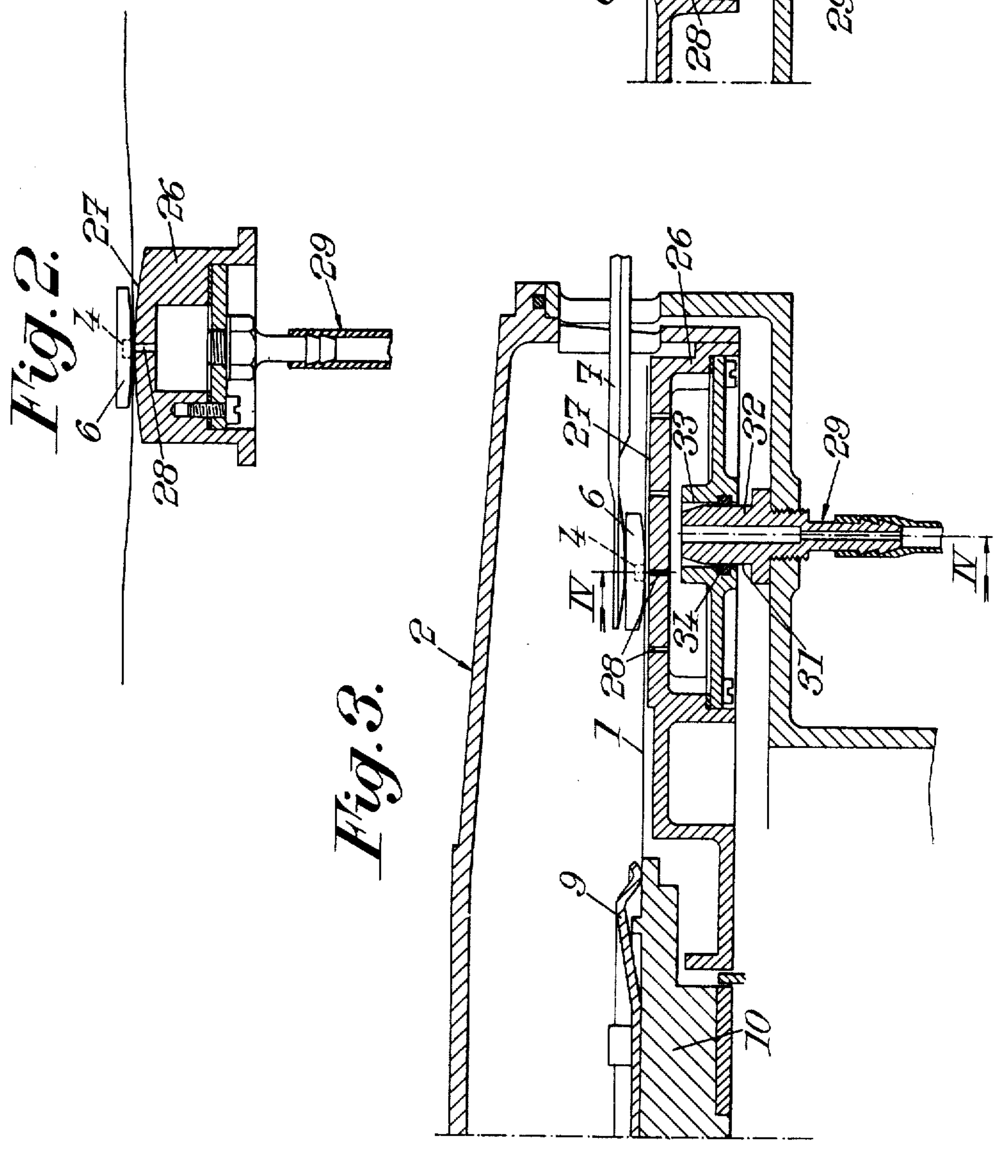
FIG. 2 is a section on a larger scale along the line II—II of FIG. 1.
FIG. 3 is a partial section of a flexible disc memory device constructed according to another embodiment of the invention.

As clearly shown in FIGS. 2 and 4, the one or more orifices 28 open on the convex surface 27 of the reference part 26 in its region closest to the flexible disc 1.

As for this convex surface 27, it is advantageously conical, or cylindrical (FIGS. 2 and 4).

In the embodiment of the invention illustrated in FIGS. 1 and 2, the reference part 26 forms part of the apparatus 3 and the cassette 2 comprises in one of its walls an opening 30 enabling the reference part 26 to cooperate with the flexible disc 1.

According to the embodiment of the invention illustrated in FIGS. 3 and 4, the reference part 26 forms part of the cassette 2, connecting means 31 being provided to connect said reference part 26 is disconnectable manner to the pressurised gas supply means 29; these connecting means 31 being advantageously constitutable by a nozzle 32 penetrating into a bore 33 formed in the reference part 26, a sealing joint 34 being provided between this nozzle 32 and this bore 33.

The application of a disc memory device constructed as has just been described is preferably effected in the following manner:

firstly the pressurised gas supply means 29 are put into operation, which has the effect of supplying the fixed reference part 26, then the rotary drive means 5 are put into operation, which has the effect of causing the rotation of the flexible disc 1;

and finally the drive device 8 is started bringing the recording and reading head into a position where it cooperates with the flexible disc 1.

This drive device 8 is arranged to ensure an approach movement of the recording and reading head 4 — support pad 6 assembly, comprising two phases, namely:

a first phase in which said assembly, which occurs in a completely withdrawn position to enable the positioning of the cassette 2, is brought into a position above the flexible disc 1, and a second phase in which the abovesaid assembly is made to approach the flexible disc 1, which has the effect of forming a hydrodynamic gaseous bearing with the support pad 6, the action of a bearing spring then intervening to compensate the forces generated in the hydrodynamic gaseous bearing.

These two phases are generally combined by means of a ramp borne by the arm 7 and which passes on translatory movement before a pin fixed on the apparatus 3.

Under these conditions and as shown in FIG. 1, the pressurised gas supply means 29 can comprise an air compressor 35 driven by an independent motor 36, for example an electric motor; this electric motor 36 and the electric motor 18 driving the drive shaft 15 are then successively placed in operation.

However one could also, as shown in FIGS. 5, 6, 7 and 8, have recourse to embodiments of the disc memory device in which there is provided a single motor 37, for example an electric motor to drive both the drive shaft 15 and an air compressor 38.

To this end, the single motor 37 can drive the air compressor 38 by direct transmission 39 (for example a belt transmission) and drive the drive shaft 15 through a transmission 40 comprising a clutch 41 arranged and controlled to become active only after the single motor 37 has reached a speed causing driving of the air compressor 38 sufficient to supply the reference part 26.

Figure 5:
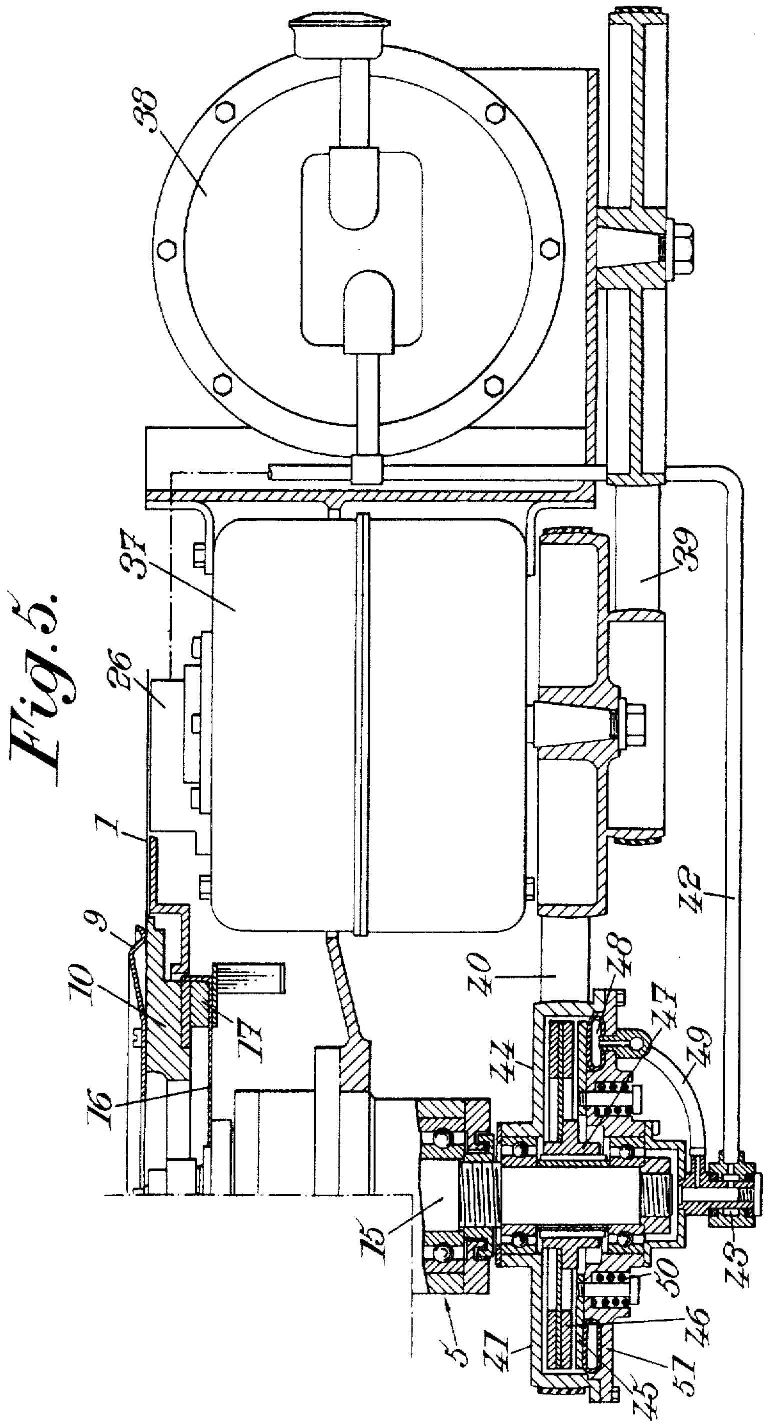
FIGS. 5, 6 and 7 are two sectional views showing details of the structure of a flexible disc memory device constructed according to the invention.

Thus in FIG. 5 the clutch 41 is a pneumatic clutch with an air input coming from the air compressor 38 through a pipe 42 ending at the clutch 41 through a rotary seal 43.

This clutch 41 comprises a loose pulley 44, driven by the single motor 37 and mounted free in rotation on the drive shaft 15, a clutch plate 45, and a clutch disc 46 fast to a grooved hub 47.

An annular air chamber 48 causes, when it is supplied with air coming from the compressor 38 through the pipe 42, the rotary seal 43 and another pipe 49, the support of the clutch plate 45 on the clutch disc 46, return springs 50 interposed between this clutch plate 45 and a counter plate 51 causing separation between the clutch plate 45 and the clutch disc 46 when the annular air chamber 48 is not supplied with a sufficient pressure.

Figure 6:
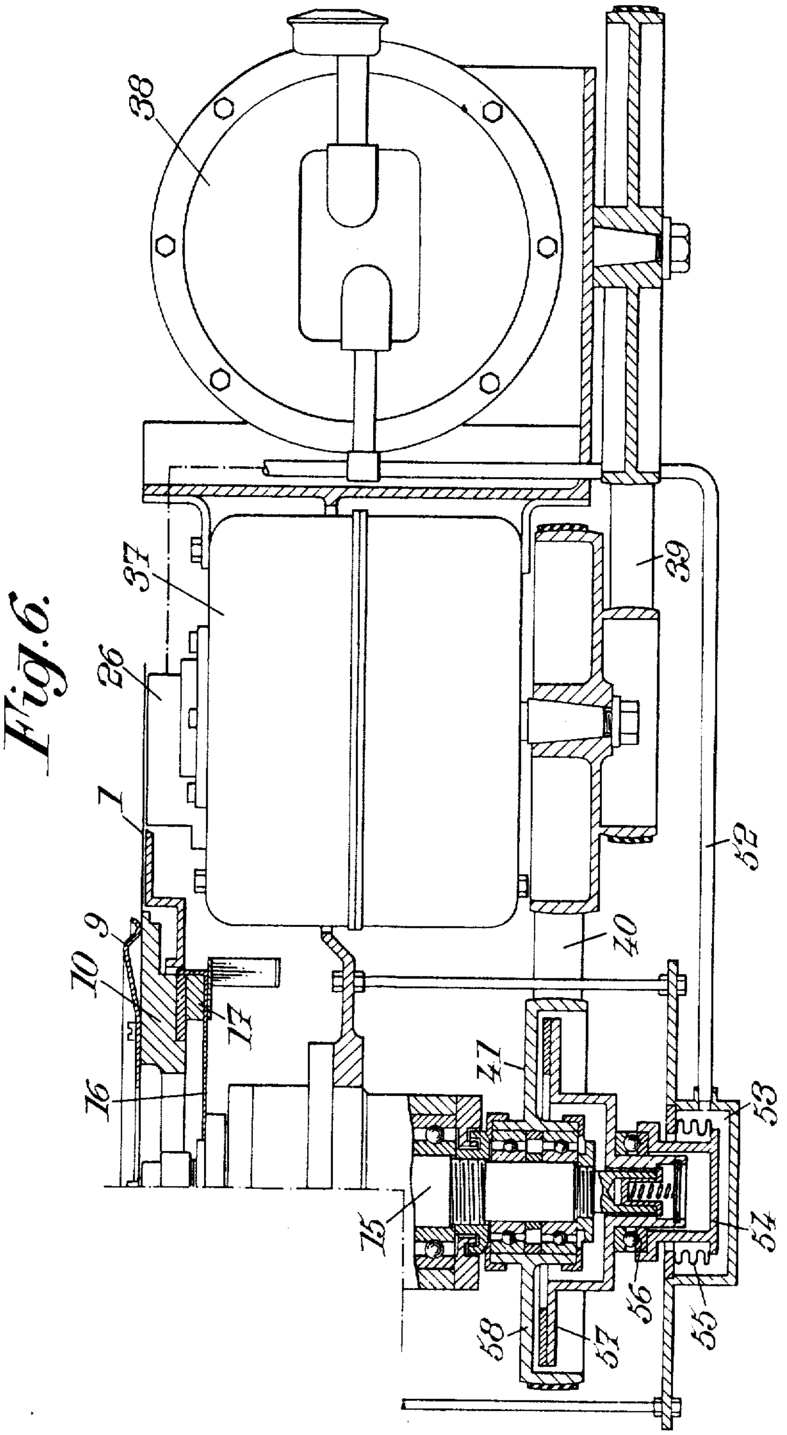

In FIG. 6, the clutch 41 is a pneumatic clutch with an air intake coming from the air compressor 38 through a pipe 52 and ending in a sealed enclosure 53 of which one wall 54 is movable by means of a metallic bellows 55. This wall 54 bears a stop 56 which holds a clutch plate 57.

When the pressure in the enclosure 53 reaches a sufficient value, this clutch plate 57 is brought to bear on a rotary plate 58 mounted loosely on the drive shaft 15 and rotated by the single motor 37; it is the elasticity of the metallic bellows 55 which, when the pressure in the enclosure 53 is insufficient, causes the separation of the clutch plate 57 with respect to the rotary plate 58.

In FIGS. 7 and 8, the clutch 41 is a centrifugal clutch comprising:

a loose pulley 59 driven by the single motor 37 and mounted free in rotation on the drive shaft 15, a clutch plate 60 fast in rotation to the drive shaft 15, and an intermediate plate 61 bearing the clutch pads 62 and their weights 63.

Each clutch pad 62 and its weight 63 are connected to the intermediate plate 61 by return springs 64.

Finally and whatever the embodiment adopted, the flexible disc memory device according to the invention has a certain number of advantages, among which may be mentioned those summarised by the following points:

the zone of the flexible disc situated facing the reference part takes a stable position with respect to the abovesaid reference part, and the position between the reading and recording head can then be determined by the effect a hydrodynamic gaseous bearing between a support pad bearing this recording and reading head and this stable zone of the flexible disc;

the device can be arranged in the form of a cassette which is introduced into an apparatus for recording or reading, without need for any particular adjustment once the cassette has been introduced;

the device is easy to produce and does not require any specially accurate adjustment since the position of the disc is fixed, at the level of the reference part, as soon as the latter is supplied with pressurised gas;

the operation of the device can be automatic on the introduction of the cassette into the apparatus.

As is self-evident and as emerges already from the foregoing, the invention is in no way limited to those of its types of application and embodiments which have been more especially envisaged; it encompasses, on the contrary, all modifications.

I claim:

1. Flexible disc memory device, comprising at least one flexible disc cooperating with a rotary drive means and of which one at least of the two surfaces has a coating of magnetic material, and at least one recording and reading head positioned to record information on this magnetic coating and/or to read the information occurring on said magnetic coating, said device comprising a fixed reference part arranged essentially parallel and close to the plane of the flexible disc, said reference part being oriented radially and having a convex surface opposite the corresponding surface of the flexible disc, said convex surface shaped such that a radial plane which includes the axis of rotation of the disc intersects this surface along a straight line and a tangential plane perpendicular to the radial plane intersects this surface along a convex curve, said reference part having a radially extending orifice means on its convex surface, comprising at least one orifice connected to pressurised gas supply means for delivering a gaseous flow in the form of a radially extending curtain directed towards the flexible disc such that the gas impinges on the disc and then flows tangentially along both sides of the reference part, the recording and reading head of said device being situated on the side of the flexible disc opposite from the reference part.

2. Device according to claim 1, wherein the orifice means of the reference part opens on its convex surface in its region closest to the plane of the flexible disc.

3. Device according to claim 1, wherein the convex surface of the reference part is shaped such that said tangential plane intersects the surface along a circular arcuate contour.

4. Device according to claim 1, wherein the recording and reading head is borne by a support foot supported on the flexible disc with the interposition of a hydrodynamic gaseous bearing.

5. Device according to claim 1, wherein the flexible disc is protected in a cassette.

6. Device according to claim 5, wherein the reference part forms part of an apparatus in which the cassette must be introduced, said cassette comprising in one of its walls an opening enabling said reference part to cooperate with the flexible disc.

7. Device according to claim 5, wherein the reference part forms part of the cassette, connecting means being provided to connect in disconnectable manner said reference part with the pressurised gas supply means.

8. Device according to claim 1, comprising a motor to drive the flexible disc and a motor to drive an air compressor constituting pressurised gas supply means.

9. Device according to claim 1, comprising a single motor to drive both the flexible disc and an air compressor constituting the pressurised gas supply means.

10. Device according to claim 9, wherein the single motor drives the air compressor by direct transmission and drives the flexible disc by a transmission comprising a clutch arranged and controlled to become active only after the single motor has reached a speed causing driving of the air compressor sufficient to supply the reference part.

11. Device according to claim 10, wherein the clutch is a pneumatic clutch and becomes active when sufficient pressure exists in a control chamber.

12. Device according to claim 10, wherein the clutch is a centrifugal clutch which becomes active beyond a certain rotary speed.

* * * * *